(12) United States Patent
Jacob et al.

(10) Patent No.: US 10,175,129 B2
(45) Date of Patent: Jan. 8, 2019

(54) METHOD FOR DETERMINING A PRESSURE MEASUREMENT SIGNAL, AND A PRESSURE MEASUREMENT ARRANGEMENT FOR SAME

(71) Applicant: VEGA GRIESHABER KG, Wolfach (DE)

(72) Inventors: Jörn Jacob, Wolfach (DE); Bernhard Weller, Wolfach (DE)

(73) Assignee: VEGA GRIESHABER KG, Wolfach (DE)

(*) Notice: Subject to any disclaimer, the term of this patent is extended or adjusted under 35 U.S.C. 154(b) by 103 days.

(21) Appl. No.: 15/514,860

(22) PCT Filed: Oct. 17, 2014

(86) PCT No.: PCT/EP2014/072288
§ 371 (c)(1),
(2) Date: Mar. 28, 2017

(87) PCT Pub. No.: WO2016/058647
PCT Pub. Date: Apr. 21, 2016

(65) Prior Publication Data
US 2017/0234748 A1    Aug. 17, 2017

(51) Int. Cl.
*G01L 9/00* (2006.01)
*G01L 13/00* (2006.01)
(Continued)

(52) U.S. Cl.
CPC .......... *G01L 9/0072* (2013.01); *G01L 13/025* (2013.01); *G01L 27/002* (2013.01)

(58) Field of Classification Search
None
See application file for complete search history.

(56) References Cited

U.S. PATENT DOCUMENTS

| 6,122,973 A * | 9/2000 | Nomura ............ G01L 9/0075 361/283.4 |
| 7,401,524 B2 * | 7/2008 | Yoshikawa ........ G01L 9/125 73/718 |
| 2007/0209443 A1 | 9/2007 | Yoshikawa et al. |

FOREIGN PATENT DOCUMENTS

| DE | 41 07 345 A1 | 9/1992 |
| EP | 0 065 845 A1 | 12/1982 |
| WO | WO 2004/013593 A1 | 2/2004 |

OTHER PUBLICATIONS

International Search Report for related application PCT/EP2014/072288, dated Jul. 16, 2015.

* cited by examiner

*Primary Examiner* — Andre Allen
(74) *Attorney, Agent, or Firm* — William Gray Mitchell

(57) ABSTRACT

The invention relates to a method for determining a pressure measurement signal in a capacitive pressure measurement cell which comprises a main body and a measurement membrane that is arranged on the front of said main body. Electrodes are arranged on said main body and measurement membrane and form a measurement capacitance in a region of the measurement membrane which has a high degree of pressure sensitivity, and form a reference capacitance in a region of the measurement membrane which has a lower degree of pressure sensitivity, said measurement capacitance and reference capacitance being determined independently of one another, the pressure measurement signal being determined in a first measurement range from the measurement capacitance and the reference capacitance, in accordance with the first evaluation, and said pressure measurement signal being determined in a second measurement range from the reference capacitance in accordance with a second evaluation.

15 Claims, 3 Drawing Sheets

(51) Int. Cl.
*G01L 13/02* (2006.01)
*G01L 27/00* (2006.01)

METHOD FOR DETERMINING A PRESSURE MEASUREMENT SIGNAL, AND A PRESSURE MEASUREMENT ARRANGEMENT FOR SAME

CROSS REFERENCE TO RELATED APPLICATIONS

This patent application claims priority to International Patent Application PCT/EP2014/072288, filed on Oct. 17, 2014.

STATEMENT REGARDING FEDERALLY SPONSORED RESEARCH OR DEVELOPMENT

No federal government funds were used in researching or developing this invention.

NAMES OF PARTIES TO A JOINT RESEARCH AGREEMENT

Not applicable.

SEQUENCE LISTING INCLUDED AND INCORPORATED BY REFERENCE HEREIN

Not applicable.

BACKGROUND

Field of the Invention

The invention relates to a method for determining a pressure measurement signal as well as a pressure measurement arrangement for implementing such a pressure measurement method.

BACKGROUND OF THE INVENTION

Various pressure measurement methods and pressure measurement arrangements are known from the prior art and implemented. In particular, ceramic capacitive pressure measurement cells are known from the prior art, which are characterized in reference to other measurement cells, among other things, by very high overload stability.

Typical ceramic capacitive pressure measurement cells comprise a main body, at the front of which a measurement membrane is arranged via a spacer, for example soldered glass. Electrodes are provided both at the measurement membrane as well as at the main body, which form a measurement capacitance in a pressure sensitive region of the measurement membrane and a reference capacitance in a less pressure sensitive region of the measurement membrane. When a pressure is applied at the front upon the measurement membrane the distance changes between the electrodes formed at the measurement membrane and the main body and thus the capacitance changes, particularly the measurement capacitance, such that by the change in capacitance conclusions can be drawn about the extent of the pressure change. It is common in the prior art that a pressure measurement signal D is determined for obtaining the pressure acting upon the measurement membrane using the formula $$D=1-C_r/C_m.$$

Due to the fact that the ratio of the reference capacitance $C_r$ to the measurement capacitance $C_m$ is considered for determining the pressure measurement value, fluctuations in the ambient conditions can be considered, i.e. particularly changes in temperature and humidity, because they no longer have any influence upon the quotient formed.

Due to the fact that generally the reference capacitance $C_r$ is considerably less pressure sensitive than the measurement capacitance $C_m$, with the evaluation of the prior art almost exclusively changes of the measurement capacitance can be detected and the pressure measurement signal D, determined according to the above formula, is saturated as soon as the measurement membrane is applied at the main body in the region of the measurement capacitance $C_m$.

In these ceramic capacitive pressure measurement cells known from prior art it is therefore considered disadvantageous that a determination of the pressure via the nominal range of the pressure measurement cell, i.e. the range permitted for technical measurements, is possible to an insufficient extent only, and particularly values exceeding the permitted nominal pressure can be detected only to an insufficient extent. With the conventional evaluation methods, in which a determination of a pressure measurement signal occurs according to the formula $$D=1-C_r/C_m,$$

any pressure applied can only be detected until approximately twice the nominal pressure of the pressure measurement cell. In case of this pressure being exceeded, the measurement membrane contacts the main body of the pressure measurement cell and the output signal determined according to the above-stated formula no longer changes to any significant extent based on the ratio between the reference capacitance and the measurement capacitance.

The objective of the present invention is to allow measurement detection even considerably beyond the nominal range of such a pressure measurement cell and to allow better analysis of any failures of pressure measurement cells caused by overload.

This objective is attained in a method and arrangement, each comprising the features as described herein.

BRIEF SUMMARY OF THE INVENTION

In a preferred embodiment, a method for determining a pressure measurement signal (D) in a capacitive pressure measurement cell (1) comprising a main body (3) and a measurement membrane (5) arranged at the front of the main body (3), with electrodes (7, 9, 11) being arranged at the main body (3) and at the measurement membrane (5), which form a measurement capacitance $C_m$ in a region of the measurement membrane (5) with high pressure sensitivity and a reference capacitance ($C_r$) in a region of the measurement membrane (5) with lower pressure sensitivity, with the measurement capacitance ($C_m$) and the reference capacitance ($C_r$) being detected independent from each other and the pressure measurement signal (D) being determined in a first measurement range according to a first evaluation (A1) of the measurement capacitance $C_r$ and the reference capacitance ($C_r$), and the pressure measurement signal (D) being determined in a second measurement range according to a second evaluation (A2) from the reference capacitance ($C_r$), characterized in that a transition from the first evaluation (A1) to the second evaluation (A2) occurs when the pressure measurement signal (D) has exceeded a limiting value (x) according to the first evaluation (A1).

In another preferred embodiment, the method as described herein, characterized in that both evaluations (A1, A2) occur simultaneously and the first evaluation (A1) is discarded if the pressure measurement signal (D) of the first evaluation (A1) exceeds the limiting value (x) and the second evaluation (A2) is discarded if the pressure measurement signal (D) of the first evaluation (A1) is below the limiting value (x).

In another preferred embodiment, the method as described herein, characterized in that the limiting value (x) is equivalent to one to five times, preferably twice the nominal pressure ($p_{nom}$) of the pressure measurement cell (1) or a value corresponding thereto.

In another preferred embodiment, the method as described herein, characterized in that a first pressure measurement signal (D1) is calculated for the first evaluation (A1) according to the formula $$D1 = 1 - C_r/C_m.$$

In another preferred embodiment, the method as described herein, characterized in that a measurement compensation occurs in the second measurement range.

In another preferred embodiment, the method as described herein, characterized in that at the transition from the first evaluation (A1) to the second evaluation (A2) the presently given value of the reference capacitance (Cr) $C_r$ (p=x) is determined and saved.

In another preferred embodiment, the method as described herein, characterized in that the value of the reference capacitance ($C_r$) is predetermined by the manufacturer at the transition from the first evaluation to the second evaluation (A2).

In another preferred embodiment, the method as described herein, characterized in that the measured value of the reference capacitance $C_r$ is compensated in the second evaluation with the saved value $C_r$ (p=x).

In another preferred embodiment, the method as described herein, characterized in that the pressure measurement signal D is calculated for the second evaluation (A2) according to the formula $$A2 = m(C_r(p) - C_r(p=x)) + x.$$

In another preferred embodiment, the method as described herein, characterized in that a maximum value of the second pressure measurement signal (D2) according to the second evaluation (A2) is saved in a storage unit.

In another preferred embodiment, the method as described herein, characterized in that a number of transitions from the first measurement range to the second measurement range is saved in a storage unit.

In another preferred embodiment, a pressure measurement arrangement for providing a pressure measurement signal (D) with a capacitive pressure measurement cell (1) comprising a main body (3) and a measurement membrane (5) arranged at the front of the main body, with electrodes (7, 9, 11) being arranged at the main body (3) and at the measurement membrane (5), which form a measurement capacitance ($C_m$) in a region of the measurement membrane (5) with high pressure sensitivity and a reference capacitance ($C_r$) in a region of the measurement membrane (5) with lower pressure sensitivity, a measurement electronic (9), which is embodied suitable to implement a pressure measurement method according to one of the preceding claims.

In another preferred embodiment, the pressure measurement arrangement as described herein, characterized in that an isolation means (13) covering the electrodes (7, 9, 11) is arranged on the measurement membrane (5) and/or the main body (3), which preferably is embodied as a glass coating.

In another preferred embodiment, the pressure measurement arrangement as described herein, characterized in that the electrode (7, 9, 11) of the measurement membrane (5) or the main body (3) is embodied in a continuous fashion, preferably as a continuous metal device, and the other electrode (7, 9, 11) is embodied in a structured fashion to form the capacitances ($C_m$, $C_r$), preferably as a structured metal device.

In another preferred embodiment, the pressure measurement arrangement as described herein, characterized in that the reference electrode (11) surrounds the measurement electrode (9) in an annular fashion.

DETAILED DESCRIPTION OF THE INVENTION

Figure 1:
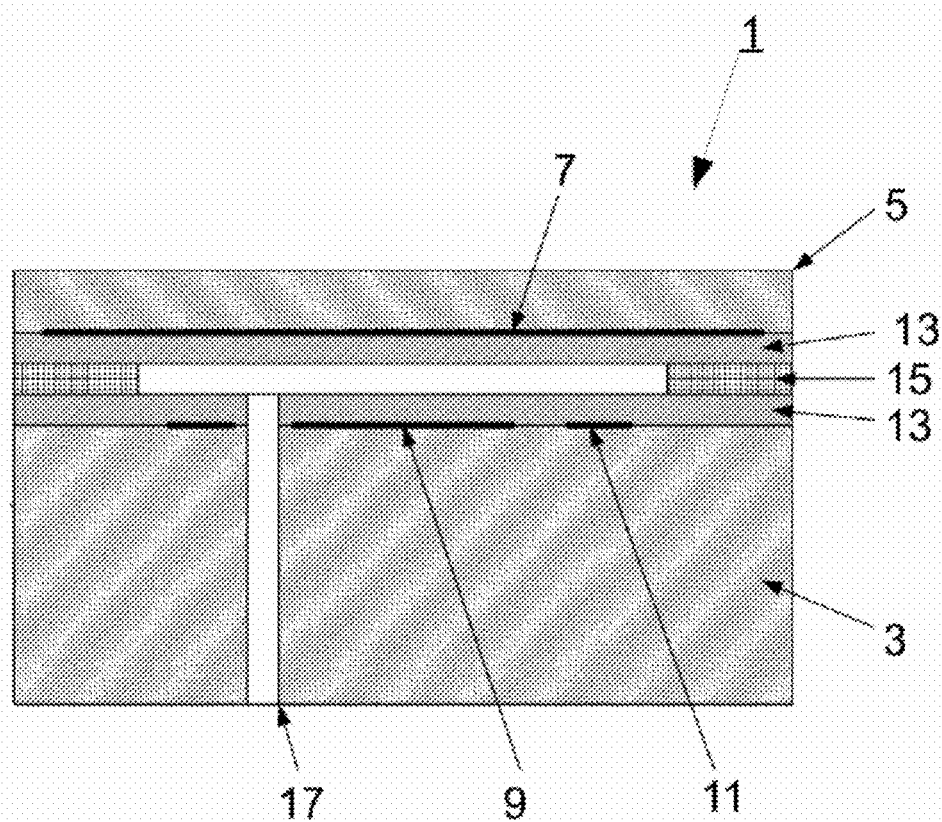
FIG. 1 is a line drawing evidencing a schematic cross-section through a ceramic capacitive pressure measurement cell as used in the present invention.

A method according to the invention for determining a pressure measurement signal in a capacitive pressure measurement cell comprising a main body and a measurement membrane arranged at the front of said main body, in which electrodes are arranged at the main body and at the measurement membrane, which form a measurement capacitance in a region of the measurement membrane with high pressure sensitivity and a reference capacitance in a region of the measurement membrane with low pressure sensitivity, with the measurement capacitance and the reference capacitance being detected independent from each other and the pressure measurement signal being determined in a first measurement range according to a first evaluation of the measurement capacitance and the reference capacitance, and the pressure measurement signal being determined in a second measurement range according to a second evaluation from the reference capacitance, is characterized in that a transition from the first evaluation to the second evaluation occurs when the pressure measurement signal has exceeded a limiting value according to the first evaluation.

For the present method it is therefore decisive that a transition from the first evaluation to the second evaluation occurs depending on a value of the pressure measurement signal according to the first evaluation and thus the pressure measurement signal compensated according to the first evaluation by the reference capacitance is the foundation for the transition.

In general it may be considered to render a transition from the first evaluation to the second evaluation dependent on an absolute value of the reference capacitance or an absolute value of the measurement capacitance, however here the disadvantage would be given that altering environmental conditions, for example a changed temperature and/or humidity, potentially influence these capacitance values and thus a transition from the first evaluation to the second evaluation would occur under different conditions, depending on the environmental influences. The advantage of the method according to the invention is therefore given in that by the transition based on the compensated value a transition from the first evaluation to the second evaluation is adjusted in a highly precise fashion and thus a precise evaluation of the pressure applied is possible even beyond the permitted measurement range of a measurement cell.

According to one embodiment of the method both evaluations are performed simultaneously and the first evaluation is discarded if the pressure measurement signal of the first evaluation exceeds the limiting value and the second evaluation is discarded if the pressure measurement signal of the first evaluation is below the limiting value.

Due to the fact that both evaluations are performed simultaneously it is possible that, depending on the result of the first evaluation, released from fluctuations of the environmental conditions as already shown, a decision is rendered as to whether the result of the first evaluation or the result of the second evaluation is issued as the pressure measurement signal.

The limiting value, which when exceeded leads to the transition from the first evaluation to the second evaluation, is set beneficially from one to five times, preferably twice the nominal pressure of the pressure measurement cell or a value corresponding thereto. In typical ceramic capacitive pressure measurement cells a so-called bottoming occurs, i.e. the measurement membrane contacts the main body due to a pressure applied, approximately starting at the two-fold nominal pressure of the pressure measurement cell. It is therefore useful, approximately at this value to provide a transition from the first evaluation to the second evaluation. Depending on the dimensioning of the pressure measurement cell, a transition from the first evaluation to the second evaluation can however also be beneficial at the nominal pressure, for example, or up to five times the nominal pressure of the pressure measurement cell.

For the selection of the limiting value the point of time is decisive from which a saturation must be expected or a serious non-linearity of the pressure measurement signal according to the first evaluation.

In a typical measurement method the pressure measurement signal is calculated for the first evaluation according to the formula $$D1=1-C_r/C_m.$$

Here the acknowledgement is decisive that the value of the measurement capacitance is proportional to the value of the pressure applied, with the reference capacitance beneficially in this range showing little dependency to the pressure applied.

Further it is beneficial when a measurement compensation also occurs in the second measurement range at pressures above the limiting value. In particular, this measurement compensation should consider environmental conditions, such as temperature and humidity.

One option to generate such measurement compensation is given in determining and saving the presently given value of the reference capacitance at the transition from the first evaluation to the second evaluation. This way, at the second evaluation a normalization can occur of the value of the reference capacitance respectively determined at the given time with the value of the reference capacitance determined at the transition from the first evaluation to the second evaluation, allowing here to at least compensate the environmental conditions given at said point in time.

Additionally or alternatively, for the second evaluation also only changes of the reference capacitance can be considered in comparison with the value saved.

In embodiments requiring only reduced precision above the limiting value or in which only minor fluctuations of the environmental conditions are expected it is further possible for the manufacturer to predetermine the value of the reference capacitance when transitioning from the first evaluation to the second evaluation and to save this value permanently in a storage unit. In this case, for example, the value of the reference capacitance can be saved for the environmental conditions typical for the sensor.

As already mentioned, this way the measured value of the reference capacitance according to the second evaluation can be compensated with the saved value of the reference capacitance and in this way a reduction can occur of the influences of environmental conditions. In particular, the second evaluation can be calculated according to the formula $$D2=m(C_r(p)-C_r(p=x))+x,$$

with $C_r$ (p) representing the presently given value of the reference capacitance, $C_r$ (p=x) the value of the reference capacitance when transitioning from the first evaluation to the second evaluation, x the limiting value, and m a constant. In simple words this way only the change of the reference capacitance, multiplied with a constant factor is considered starting at the point in time of the transition to the second evaluation, with the limiting value and the multiplier being predetermined by the manufacturer.

It can further be advantageous when a maximum value according to the second evaluation and/or a number of transitions from the first evaluation to the second evaluation is saved in a storage unit. This way a maximum pressure load and/or the number of overload cycles can be provided for later evaluations.

A pressure measurement arrangement according to the invention for providing a pressure measurement signal with a capacitive pressure measurement cell comprising a main body and a measurement membrane arranged at the front of the main body, with electrodes being arranged at the main body and at the measurement membrane, which form a measurement capacitance in a region of the measurement membrane with high pressure sensitivity [and] a reference capacitance in a region of the measurement membrane with low pressure sensitivity, is characterized by a measurement electronic, which is embodied suitable to implement a pressure measurement method according to one of the preceding claims.

Advantageously an isolation means covering the electrodes is arranged on the measurement membrane and/or the main body, which preferably is embodied as a glass coating. In many pressure measurement cells known from the prior art the electrodes, generally embodied as metal devices, are provided unprotected on the measurement membrane and/or the main body of the pressure measurement cell such that in case of bottoming due to the electrodes being contacted, short-circuitry thereof occurs and thus a determination of the capacitance is no longer possible.

With the provision of such an isolation the production of the pressure measurement cell can be further simplified because in this way it is possible to embody the electrode of the measurement membrane or the main body in a continuous fashion, preferably a continuous metal device, and to embody the other electrode for forming the capacitances in a structured fashion, preferably as a structured metal device.

Typically, in such an embodiment the electrode and/or metal device arranged at the measurement membrane is embodied as a continuous electrode and/or metal device, because this way only a single electric contacting of the measurement membrane needs to be provided. In order to embody the measurement and reference electrode the metal device arranged on the main body is embodied in a structured fashion, with for example the reference electrode surrounding the measurement electrode in an annular fashion.

DETAILED DESCRIPTION OF THE FIGURES

FIG. 1 shows a schematic cross-section through a ceramic capacitive pressure measurement cell 1, as can be used in the present invention. The pressure measurement cell 1 essentially comprises a main body 3 made from a ceramic material, with a measurement membrane 5 being arranged at the front thereof and spaced apart therefrom via a spacer 15, for example soldered glass.

Electrodes 7, 9, 11 for generating a measurement capacitance $C_m$ as well as a reference capacitance $C_r$ are formed on the main body 3 and the measurement membrane 5, positioned opposite each other and at a distance, with a centrally arranged measurement electrode 9 and a reference electrode 11 surrounding it in an annular fashion being embodied at the main body 3 by way of a structured metal device. At the measurement membrane 5, due to a continuous metal device, a membrane electrode 7 is embodied, which forms the measurement capacitance $C_m$ as well as the reference capacitance $C_r$ in cooperation with the measurement electrode 9 and/or the reference electrode 11.

In the present exemplary embodiment the electrodes 7, 9, 11 are isolated from each other and protected from mechanic influences via isolation 13, for example implemented in the form of glass coating. When in the present pressure measurement cell 1, due to overpressure, the measurement membrane 5 is bent to such an extent that it comes into contact with the main body 3, the isolation 13 here prevents any contact between the electrodes 7, 9, 11 and thus any short-circuitry between them. This way the determination of the measurement capacitance $C_m$ as well as the reference capacitance $C_r$ is always possible, even in the case of overpressure.

Figure 2:
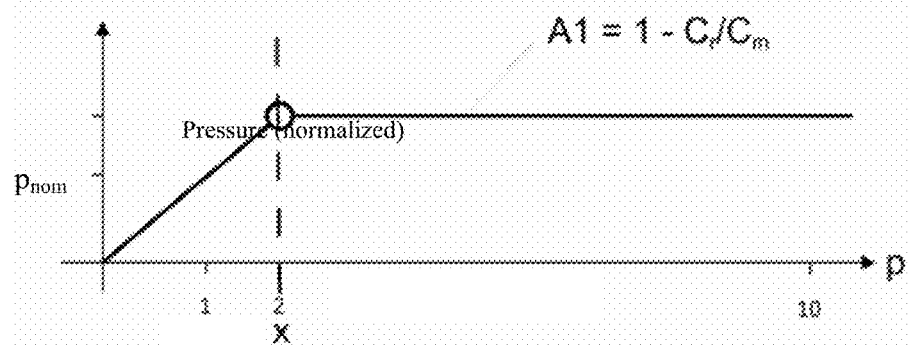
FIG. 2 is a line drawing evidencing a schematic progression of the pressure measurement signal according to a first evaluation.

Due to the above-described effect during overload, namely that the measurement membrane 5 contacts the main body 3, typical ceramic capacitive pressure measurement cells 1 are licensed only for a certain measurement range and thus particularly licensed for pressure measurement up to a certain nominal pressure $p_{nom}$. In spite of this, such pressure measurement cells 1 are sometimes impinged with pressure considerably exceeding the licensed nominal pressure $p_{nom}$. A determination of the pressure applied is here possible via the typically used first evaluation A1, in which the first pressure measurement signal D1 is determined according to the formula $$D1 = 1 - C_r/C_m$$

up to approximately twice the nominal pressure $p_{nom}$ of the pressure measurement cell 1. In a range above this two-fold nominal pressure $p_{nom}$ the first evaluation A1 typically shows non-linearities and/or a saturation behavior of the first pressure measurement signal D1 determined in this fashion, as shown in FIG. 2. The measurement curve shown in FIG. 2 illustrates the first pressure measurement signal D1 determined according to the first evaluation A1, with the pressure being shown normalized by the nominal pressure $p_{nom}$.

Figure 3:
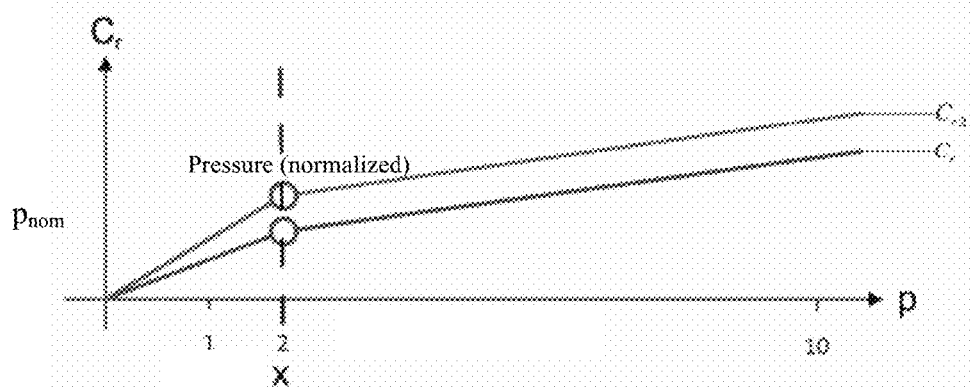
FIG. 3 is a line drawing evidencing a schematic progression of the reference capacitance under different environmental conditions.

FIG. 3 also shows the value of the reference capacitance $C_r$ under different environmental conditions above the pressure normalized by the nominal pressure $p_{nom}$. In particular due to changing humidity the dielectricity number can change, developing inside the pressure measurement cell 1, which leads to different progressions of the reference capacitance $C_r$. If a reliable pressure determination shall also occur in a precise fashion above, for example via the two-fold nominal pressure $p_{nom}$, previously displayed as the limiting value x in the measurement curves shown, compensation of the environmental conditions is required to determine the value of the reference capacitance $C_r$.

Figure 4:
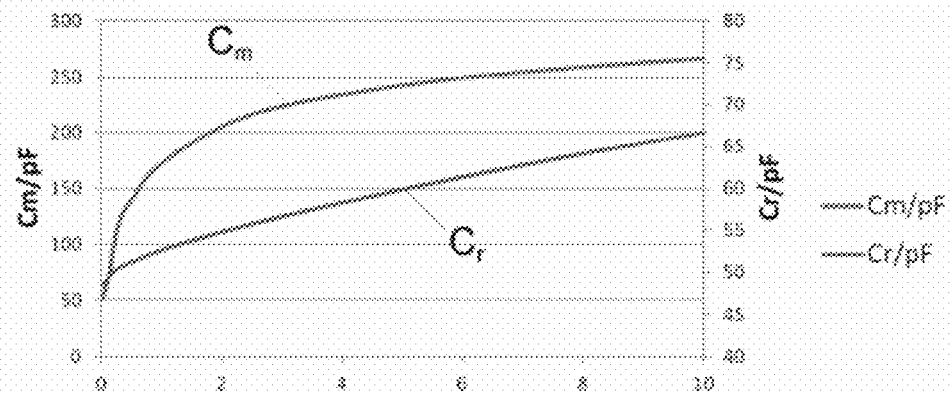
FIG. 4 is a line drawing evidencing the progression of the measurement capacitance as well as the reference capacitance in a ceramic capacitive pressure measurement cell with a nominal pressure of 0.1 bar.

FIG. 4 shows the values of the measurement capacitance $C_m$ of the reference capacitance $C_r$ for a ceramic capacitive pressure measurement cell 1 with a nominal pressure $p_{nom}$ of 0.1 bar ranging from 0 to 10 bar. As clearly discernible from the measurement curves in FIG. 4, the value of the measurement capacitance $C_m$ represents a multitude of the value of the reference capacitance $C_r$, with however the measurement capacitance $C_m$ showing a linear behavior only up to approximately the two-fold nominal value $p_{nom}$ of the measurement cell 1, and the reference capacitance $C_r$ still largely changing linearly at a clear exceeding of the nominal pressure $p_{nom}$. Due to this linear change of the reference capacitance $C_r$ in the overload range, when evaluating the reference capacitance $C_r$, a determination of the pressure applied can even be achieved up to a hundred-fold exceeding of the permitted nominal value $p_{nom}$ of the pressure measurement cell 1, in the present case up to 10 bar.

Figure 5:
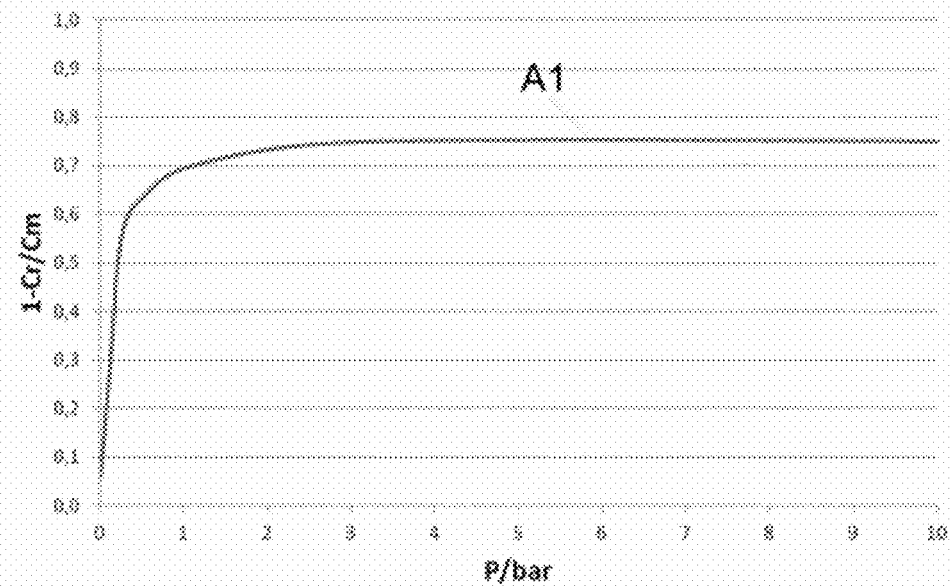
FIG. 5 is a line drawing evidencing the progression of the pressure measurement signal according to the first evaluation in the pressure measurement cell of FIG. 4.

FIG. 5 shows the first pressure measurement signal D1 determined according to the first evaluation A1, with it being clearly discernible from the illustration in FIG. 5 that by this first evaluation A1 a linear change of the first pressure measurement signal D1 can only be recorded up to approximately two-fold the nominal pressure $p_{nom}$ of the pressure measurement cell 1. Beyond that, the first pressure measurement signal D1 yielded via the first evaluation A1 is initially no longer linear and then transfers to saturation.

The second pressure measurement signal D2 determined according to the second evaluation A2 can be generated for example according to the formula $$D2 = m \times (C_r(p) - C_p(p \times x)) + x$$

with m representing a measurement constant, $C_r$ (p) the value of the reference capacitance $C_r$ determined at the presently given pressure, $C_r$ (p=x) the value of the reference capacitance $C_r$ determined at the transition from the first evaluation A1 to the second evaluation A2, at the limiting value x, and x representing the limiting value.

For higher precision requirements it would also be possible to perform the second evaluation A2 with a higher-level polynomial, for example with an approximation of the applied pressure, or, in case of lower precision requirements, for the manufacturer to predetermine the value of the reference capacitance for internal calibration.

LIST OF REFERENCE NUMBERS

1 Pressure measurement cell
2 Main body
5 Measurement membrane
7 Membrane electrode
9 Measurement electrode
11 Reference electrode
13 Isolation 15 Spacer
17 Pressure compensation opening
A1 First evaluation
A2 Second evaluation
D1 First pressure measurement signal
D2 Second pressure measurement signal
x Limiting value
$C_m$ Measurement capacitance
$C_r$ Reference capacitance
D Pressure measurement signal
$p_{nom}$ Nominal pressure The references recited herein are incorporated herein in their entirety, particularly as they relate to teaching the level of ordinary skill in this art and for any disclosure necessary for the commoner understanding of the subject matter of the claimed invention. It will be clear to a person of ordinary skill in the art that the above embodiments may be altered or that insubstantial changes may be made without departing from the scope of the invention. Accordingly, the scope of the invention is determined by the scope of the following claims and their equitable equivalents.

We claim:

1. A method for determining a pressure measurement signal (D) in a capacitive pressure measurement cell comprising a main body and a measurement membrane arranged at the front of the main body, with electrodes being arranged at the main body and at the measurement membrane, which form a measurement capacitance $C_m$ in a region of the measurement membrane with high pressure sensitivity and a reference capacitance ($C_r$) in a region of the measurement membrane with lower pressure sensitivity, with the measurement capacitance and the reference capacitance ($C_r$) being detected independent from each other and the pressure measurement signal (D) being determined in a first measurement range according to a first evaluation (A1) of the measurement capacitance $C_m$ and the reference capacitance ($C_r$), and the pressure measurement signal (D) being determined in a second measurement range according to a second evaluation (A2) from the reference capacitance ($C_r$), wherein a transition from the first evaluation (A1) to the second evaluation (A2) occurs when the pressure measurement signal (D) has exceeded a limiting value (x) according to the first evaluation (A1).

2. The method according to claim 1, wherein both evaluations (A1, A2) occur simultaneously and the first evaluation (A1) is discarded if the pressure measurement signal (D) of the first evaluation (A1) exceeds the limiting value (x) and the second evaluation (A2) is discarded if the pressure measurement signal (D) of the first evaluation (A1) is below the limiting value (x).

3. The method according to claim 1, wherein the limiting value (x) is equivalent to one to five times, preferably twice the nominal pressure ($p_{nom}$) of the pressure measurement cell or a value corresponding thereto.

4. The method according to claim 1, wherein a first pressure measurement signal (D1) is calculated for the first evaluation (A1) according to the formula $$D1 = 1\,C_r/C_m.$$

5. The method according to claim 1, wherein a measurement compensation occurs in the second measurement range.

6. The method according to claim 1, wherein at the transition from the first evaluation (A1) to the second evaluation (A2) the presently given value of the reference capacitance (Cr) $C_r$ (p=x) is determined and saved.

7. The method according to claim 1, wherein the value of the reference capacitance ($C_r$) is predetermined by the manufacturer at the transition from the first evaluation to the second evaluation (A2).

8. The method according to claim 6, wherein the measured value of the reference capacitance $C_r$ is compensated in the second evaluation with the saved value $C_r$ (p=x).

9. The method according to claim 1, wherein the pressure measurement signal D is calculated for the second evaluation (A2) according to the formula $$A2 = m(C_r(p) - C_r(p=x)) + x.$$

10. The method according to claim 1, wherein a maximum value of the second pressure measurement signal (D2) according to the second evaluation (A2) is saved in a storage unit.

11. The method according to claim 1, wherein a number of transitions from the first measurement range to the second measurement range is saved in a storage unit.

12. A pressure measurement arrangement for providing a pressure measurement signal (D) with a capacitive pressure measurement cell, comprising
    a main body and a measurement membrane arranged at the front of the main body, with electrodes being arranged at the main body and at the measurement membrane, which form a measurement capacitance ($C_m$) in a region of the measurement membrane with high pressure sensitivity and a reference capacitance ($C_r$) in a region of the measurement membrane with lower pressure sensitivity, and
    a measurement electronic, which is embodied suitable to implement a pressure measurement method according to one of the preceding claims.

13. The pressure measurement arrangement according to claim 12, wherein an isolation means covering the electrodes is arranged on the measurement membrane and/or the main body, which is embodied as a glass coating.

14. The pressure measurement arrangement according to claim 12, wherein the electrode of the measurement membrane or the main body is embodied in a continuous fashion, preferably as a continuous metal device, and the other electrode is embodied in a structured fashion to form the capacitances ($C_m$, $C_r$), preferably as a structured metal device.

15. The pressure measurement arrangement according to claim 14, wherein the reference electrode surrounds the measurement electrode in an annular fashion.

* * * * *